A. F. POOLE.
SPEEDOMETER.
APPLICATION FILED AUG. 28, 1909.
1,158,281.
Patented Oct. 26, 1915.
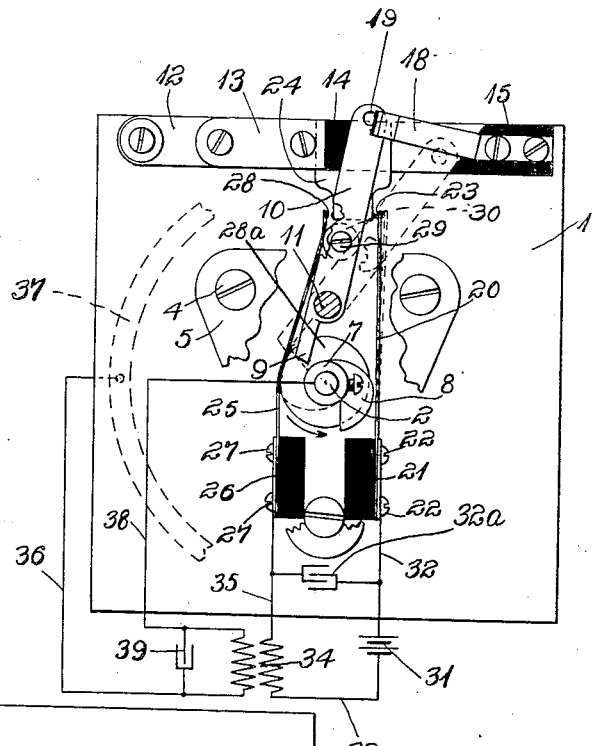
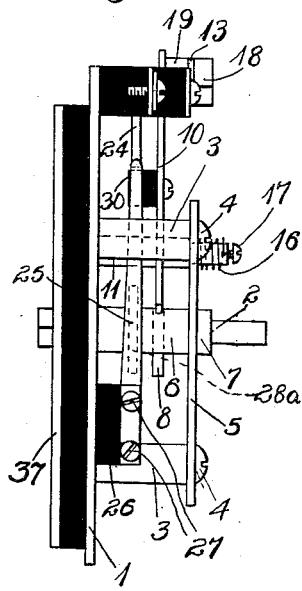
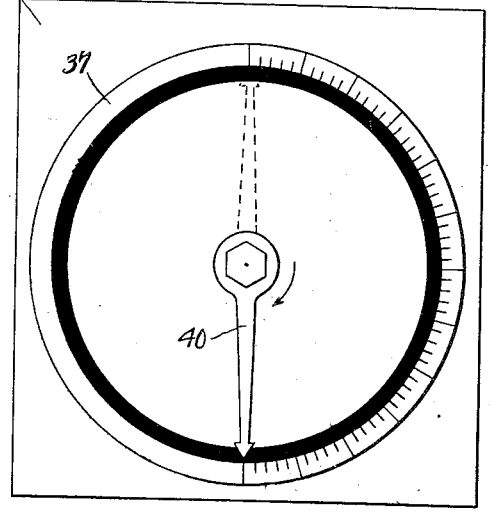
Witnesses
George E. Higham
Frank J. Thelen
Inventor
Arthur F. Poole
By Brown Williams
Attorneys

UNITED STATES PATENT OFFICE.

ARTHUR F. POOLE, OF CHICAGO, ILLINOIS.

SPEEDOMETER.

1,158,281.   Specification of Letters Patent.   Patented Oct. 26, 1915.

Application filed August 28, 1909. Serial No. 515,016.

*To all whom it may concern:*

Be it known that I, ARTHUR F. POOLE, a citizen of the United States, residing at Chicago, in the county of Cook and State of Illinois, have invented a certain new and useful Improvement in Speedometers, (Case 8,) of which the following is a full, clear, concise, and exact description, reference being had to the accompanying drawings, forming a part of this specification.

My invention relates to speedometers and has particular reference to a form of speedometer in which the speed is indicated by means of the relative position of a light emitting spark on a graduated scale. My speedometer is particularly useful for determining the speed of automobiles and other similar vehicles.

One of the great disadvantages in the ordinary forms of speedometers which have been used in the past is that as the speed to be measured increases, the accuracy of the speedometer decreases. The general principle of the operation of such speedometers is the measurement of the distance through which governor balls are moved by the centrifugal force caused by the rotation of a shaft, this rotation being transferred by suitable means to the governor balls. Not only are such speedometers inaccurate in operation, particularly as the higher speeds are indicated, but they are expensive to construct, and in order to guard against breakage when there are sudden variations in speed, it is necessary to construct a mechanism by which the governor is connected with the shaft the speed of which is to be measured, of very strong and heavy material.

The principle on which my speedometer is constructed is the measurement of the distance through which a member connected with the rotating shaft travels in a predetermined length of time, the time element being constant and indicated by the spring controlled movement of a pivoted member from one predetermined point to another. Otherwise expressed if $\theta$=the angle through which a member connected with the rotating shaft travels in a given time $t$, and $\omega$=the angular velocity of the member, then $\theta = \omega t$ and $\theta$ therefore varies directly as $\omega$.

The specific form in which I embody my invention consists in providing a pointer of electrically conductive material, the end of which rotates about a circular graduated scale at a slight distance therefrom. The shaft on which the pointer is mounted is suitably connected to the shaft of which the speed is to be measured. Mounted on the same shaft as the pointer is a cam which moves an arm into a predetermined position against the action of a suitable spring. The cam is so shaped that when the above mentioned pointer is opposite the zero mark of the scale, the arm is released from the cam and travels by the action of the spring a predetermined distance in a predetermined length of time. As the arm begins to move, mechanism is provided by which an electrical circuit is closed and when the arm approaches the limit of its path of travel this circuit is automatically broken. It is evident that the pointer which is at the zero of the scale mark when the arm begins to move will travel a distance directly proportional to the speed of the rotating shaft to be measured when the arm reaches the point in its travel at which the circuit is broken. Suitable connections are provided with the pointer and the indicating scale so that when the current is so broken, a spark will travel from the end of the pointer to the scale and the position of this spark will indicate the speed of rotation of the shaft to be measured.

It is evident that by means of my invention the distance that the pointer travels before the spark is formed will vary directly as the speed of the shaft and that my speedometer will be as accurate for the measurement of high speeds as for the measurement of low speeds.

These and other advantages of my invention will be more apparent in the accompanying drawings in which—

Figure 1 is a rear elevation of my speedometer in which a part of the framework is removed, the circuit connections being diagrammatically shown. Fig. 2 is a front elevation showing the pointer and indicating scale, and Fig. 3 is a side elevation.

Rotatably mounted in the casing 1 is the shaft 2 which is connected by means of suitable gearing or otherwise (not shown), with the shaft the speed of which is to be measured.

Mounted on the casing 1 by means of posts 3 and screws 4 is the plate 5. On shaft 2 is rigidly mounted the sleeve 6 and collar 7 which serve to hold the shaft 2 from lateral displacement. Attached to the sleeve 6 is the cam 8 which is adapted to engage the portion 9 of the arm 10, which is rigidly attached to the rotatable shaft 11.

Mounted on the framework 1, on the block 12, is the bracket 13 provided with the insulated stop surface 14. Also mounted on the same block 12 is the insulated stop surface 15, the two stops 14 and 15 serving to limit the movement of the arm 10.

A spring 16 encircles the shaft 11 to which arm 10 is attached, and at one end this spring is attached to shaft 11 by means of set-screw 17, the other end of the spring being attached to the plate 5. The spring 16 serves to normally hold the arm 10 in position shown in full lines in Fig. 1.

A leaf spring 18 is suitably mounted on frame 1 and when the arm 10 is carried into the position shown in full lines in Fig. 1 by the action of spring 16, the spring 18 engages the lug 19 near the end of arm 10 and prevents any return or jumping movement of the arm. The engagement of spring 18 with lug 19 is by means of a sloping surface so that when cam 8 engages the inner end 9 of arm 10, the lug 19 is readily disengaged from spring 18.

A spring 20 is mounted on insulating block 21 by means of screws 22 and contact 23 on the end of spring 20 is normally held against the block 24 of electrical conducting material such as copper or brass. A spring 25 is similarly mounted on insulating block 26 by means of screws 27 and the contact 28 is normally held in connection with the conducting block 24. The contacts on block 24 and springs 20 and 25 are of platinum or other conducting metal.

Rigidly mounted on sleeve 6 is the cam 28<sup>a</sup> which normally engages spring 25 and removes contact 28 from block 24, as described hereafter.

Mounted on the arm 10 by means of screw 29 is the lug 30 of insulating material. When the arm 10 is in the position shown in full lines in Fig. 1, the insulating lug 30 prevents spring 25 from moving to the right and allowing connection to be formed between contact 28 and block 24. On the other hand, when arm 30 is in the position shown in dotted lines, the lug 30 moves the spring 20 to the right and removes contact 23 from the block 24.

Connected to one pole of the battery 31 is the conductor 32 leading to the spring 20. To the second pole of the battery 31 is connected conductor 33 leading to the primary winding of transformer 34. At its opposite end the primary of transformer 34 is connected with spring 25 through the conductor 35. Between conductors 32 and 35 is condenser 32<sup>a</sup>. The conductor 36 is connected at one end with the secondary winding of the transformer 34 and at the other end to the graduated scale 37 of electrically conducting material such as copper or brass mounted on the front of the frame 1. The conductor 38 is connected at one end with the opposite terminal of the secondary of transformer 34 and on the other end to shaft 2. Between conductors 36 and 38 is provided the capacity 39 the object of which will be explained hereafter.

Rigidly mounted on the shaft 2 is the pointer 40 which is adapted to rotate within the scale 37 in the direction indicated by the arrow in Fig. 2.

The operation of my speedometer may now be clearly understood. As the shaft 2 rotates, cam 8 engages the inner end 9 of the arm 10, which is thereby carried into the position indicated in dotted lines in Fig. 1. As this movement begins cam 28<sup>a</sup> engages spring 25 and contact 28 is held away from block 24, this having been previously accomplished by lug 30 engaging spring 25. The lug 30 now engages the spring 20 and contact 23 is removed from block 24. After this happens the further rotation of shaft 2 removes cam 28<sup>a</sup> from engagement with spring 25 and contact 28 forms a connection with block 24. The pointer 40 is mounted on the shaft 2 in such a position that at the instant when the inner end 9 of arm 10 is disengaged from the cam 8, the pointer will be opposite the zero of scale 37. As the arm 10 begins to move from the position indicated in dotted lines in Fig. 1, to the left, spring 20 is allowed to move to the left and contact 23 engages block 24, the circuit from battery 31 thereby being closed. During the time which is occupied by the movement of the arm 10 to the left the pointer moves in a clock-wise direction within the circular scale 37. At the instant when lug 30 strikes the spring 25 and removes contact 28 from block 24, the circuit associated with battery 31 is broken and the circuit connected with the secondary of transformer 34, is, of course, simultaneously broken. When this occurs a spark travels from the end of pointer 40, which is electrically connected with conductor 38 through shaft 2, to the nearest point of the scale 37. The position of this spark on the scale indicates the rapidity of rotation of the shaft whose speed is to be measured. It is evident that the time occupied by the movement of arm 10 from the position shown in dotted lines in Fig. 1 to the position at which the circuit is broken will remain constant, whereas the distance which the pointer 40 travels around the scale 37 in the same time will be variable and in direct proportion to the rotating speed of shaft 2.

The capacity 39 is provided in order to render the spark traveling from the end of pointer 40 to scale 37 whiter and more luminous, thereby making it more readily visible. The condenser 32<sup>a</sup> is for the purpose of reducing the spark between contact 28 and block 24 when the circuit is broken.

One great advantage of my speedometer is that the speed indications are as clearly seen at night as in the day time. In practice the shaft 2 rapidly rotates with the results that sparks are very rapidly formed between the pointer 40 and scale 37 and the speed can thereby be constantly determined.

Many changes could be made in the detailed construction of my device without departing from the spirit of my invention.

What I claim as new and desire to cover by United States Letters Patent is:

1. In a speedometer, the combination of a member rotating at a speed proportional to the speed of the shaft to be measured, means for rotating said rotating member, means for determining a constant lapse of time beginning when said member reaches a predetermined position, measuring means definitely associated with said rotating member, and means operable with said timing means for causing the emission of light from said rotating member at the end of said lapse of time, the position of said light on said measuring means indicating the speed at which the shaft is rotated.

2. In a speedometer, the combination of a member rotating at a speed proportional to the speed of the shaft to be measured, means for rotating said rotating member, means for determining a constant lapse of time beginning when said member reaches a predetermined position, measuring means definitely associated with said rotating member and to form a spark gap, an electrical circuit in which said rotating member is included, said circuit being broken by the operation of said timing means at the end of said lapse of time thereby generating a spark between said rotating member and measuring means, the position of said spark relative to said measuring means indicating the speed at which said shaft is rotated.

3. In a speedometer, the combination of an electrically conductive rotating pointer, means for rotating said pointer at a speed proportional to the speed of the shaft to be measured, a member of electrically conductive material associated with said pointer to form a spark gap, means for determining a constant lapse of time, means for adjusting said time determining means and restraining it from action until said pointer is in a predetermined position, an electric circuit in which said pointer and its associated member are included, means for closing said circuit, and means associated with said means for determining a constant lapse of time and adapted for opening said circuit at the end of said constant lapse of time thereby generating a spark between said pointer and its associated member, the position of the spark indicating the speed at which said shaft is rotated.

4. In a speedometer, the combination of an electrically conductive rotating pointer, means for rotating said pointer at a speed proportional to the speed of the shaft to be measured, a member of electrically conductive material associated with said pointer to form a spark gap, means for determining a constant lapse of time, means associated with said rotating means and adapted for adjusting said time determining means and restraining it from action until said pointer is in a predetermined position, an electric circuit, a transformer included in said circuit, means connecting the secondary of said transformer with said pointer and its associated member, means for closing said circuit, and means associated with said means for determining a constant lapse of time and adapted for opening said circuit at the end of said constant lapse of time thereby causing a spark to be generated between said pointer and its associated member, the position of the spark indicating the speed at which the shaft is rotated.

5. In a speedometer, the combination of an electrically conductive rotating pointer, means for rotating said pointer at a speed proportional to the speed of the shaft to be measured, a member of electrically conductive material associated with said pointer to form a spark gap, means for determining a constant lapse of time, means associated with said rotating means and adapted for adjusting said time determining means and restraining it from action until said pointer is in a predetermined position, an electric circuit, a transformer included in said circuit, means connecting the secondary of said transformer with said pointer and its associated member, means for closing said circuit, and means associated with said means for determining a constant lapse of time and adapted for opening said circuit at the end of said constant lapse of time thereby causing a spark to be generated between said pointer and its associated member, and a capacity associated with the circuit connected with the secondary of said transformer, said capacity adapted to render said spark more luminous, the position of the spark indicating the speed at which the shaft is rotated.

6. In a speedometer, the combination of an electrically conductive rotating pointer, means for rotating said pointer at a speed proportional to the speed of the shaft to be measured, a scale of conducting material associated with said pointer to form a spark gap, means for measuring a constant time unit, means associated with said rotating means and adapted for adjusting said time measuring means and restraining it from action until the pointer is opposite a predetermined position on said scale, an electric circuit including said pointer and scale, means for closing said circuit, and means associated with said means for measuring a constant time unit and adapted for breaking the circuit at the termination of the time unit thereby causing a spark to travel between said pointer and said scale, the position of said spark on said scale indicating the speed of the shaft whose speed is to be determined.

7. In a speedometer, the combination of a rotatable shaft adapted to be connected with a member the speed of which is to be determined, a pointer of electrically conductive material mounted on said shaft, a scale of conductive material associated with said pointer to form a spark gap, a cam mounted on said shaft, an oscillatory arm having a normal and an alternate position and movable in one direction to its alternate position by said cam on rotation of said shaft, means for returning said arm to its normal position in a constant unit of time when released from said cam, an electric circuit including said pointer and scale, means for closing said circuit, and means on said arm for opening said circuit at a predetermined point in the movement of said arm from its alternate to its normal position, the opening of said circuit causing a spark between said pointer and said scale thereby indicating the speed of the member whose speed is to be determined.

8. In a speedometer, the combination of a rotatable shaft adapted to be connected with a member the speed of which is to be determined, a pointer of electrically conductive material mounted on said shaft, a scale of conductive material associated with said pointer to form a spark gap, a cam mounted on said shaft, an oscillatory arm having a normal and an alternate position and movable in one direction to its alternate position by said cam on rotation of said shaft, means for returning said arm to its normal position in a constant unit of time when released from said cam, an electric circuit, means for closing said circuit, and means on said oscillatory arm for opening said circuit at a predetermined point in the movement of said arm from its alternate to its normal position, a transformer in said circuit, and means connecting said pointer and said scale with the secondary of said transformer, the opening of said circuit causing a spark between said pointer and said scale thereby indicating the speed of the member whose speed is to be determined.

9. In a speedometer, the combination of a rotatable shaft adapted to be connected with a member the speed of which is to be determined, a pointer of electrically conductive material mounted on said shaft, a scale of conductive material associated with said pointer to form a spark gap, a cam mounted on said shaft, an oscillatory arm having a normal and an alternative position, and movable in one direction to its alternative position by said cam on rotation of said shaft, means for returning said arm to its normal position in a constant unit of time when released from said cam, an electric circuit, means for closing said circuit, means adapted to be engaged by said oscillatory arm for opening said circuit at a pre-determined point in the movement of said arm from its alternate to its normal position, a transformer in said circuit, means connecting said pointer and said scale with the secondary of said transformer, the opening of said circuit causing a spark between said pointer and said scale thereby indicating the speed of the member whose speed is to be determined, and a capacity in the circuit associated with the secondary of said transformer, said capacity adapted to render said spark more luminous.

10. In a speedometer, the combination of a rotatable shaft adapted to be connected with the member the speed of which is to be determined, a pointer of electrically conductive material mounted on said shaft, a scale of conductive material associated with said pointer to form a spark gap, a cam mounted on said shaft, an oscillatory arm having a normal and an alternate position and movable in one direction to its alternate position by said cam on rotation of said shaft, means for returning said arm to its normal position in a constant unit of time when released from said cam, an electric circuit including said pointer and scale, a pair of terminals in said circuit, means in said electric circuit for normally conductively connecting said terminals, and a lug on said arm adapted to conductively disconnect one of said terminals from said means and thereby open said circuit at a predetermined point in the movement of said arm from its alternate to its normal position, said lug holding said terminals disconnected while said arm is in its normal position, causing a spark between said pointer and said scale on the opening of said circuit thereby indicating the speed of the member whose speed is to be determined.

11. In a speedometer, the combination of a rotatable shaft adapted to be connected with the member the speed of which is to be determined, a pointer of electrically conductive material mounted on said shaft, a scale of conductive material associated with said pointer to form a spark gap, a cam mounted on said shaft, an oscillatory arm having a normal and an alternate position and movable in one direction to its alternate position by said cam on rotation of said shaft, means for returning the said arm to its normal position in a constant unit of time when released from said cam, an electrical circuit, a pair of terminals in said circuit, means in said electric circuit for normally conductively connecting said terminals, a lug on said arm adapted to conductively disconnect one of said terminals from said means and thereby open said circuit at a predetermined point in the movement of said arm from its alternate to its normal position, said lug holding said terminals disconnected while said arm is in its normal position, a transformer in said circuit, and means connecting said pointer and said scale with the secondary of said transformer, the opening of said circuit generating a spark between said pointer and said scale thereby indicating the speed of the member whose speed is to be determined.

12. In a speedometer, the combination of a rotatable shaft adapted to be connected with the member the speed of which is to be determined, a pointer of electrically conductive material mounted on said shaft, a scale of conductive material associated with said pointer to form a spark gap, a cam mounted on said shaft, an oscillatory arm having a normal and an alternate position and movable in one direction to its alternate position by said cam on rotation of said shaft, means for returning said arm to its normal position in a constant unit of time when released from said cam, an electrical circuit, a pair of terminals in said circuit, means in said electric circuit for normally conductively connecting said terminals, a lug on said arm adapted to conductively disconnect one of said terminals from said means and thereby open said circuit at a predetermined point in the movement of said arm from its alternate to its normal position, said lug holding said terminals disconnected while said arm is in its normal position, a transformer in said circuit, means connecting said pointer and said scale with the secondary of said transformer, the opening of said circuit generating a spark between said pointer and said scale thereby indicating the speed of the member whose speed is to be determined, and a capacity in the circuit associated with the secondary of said transformer, said capacity adapted to render said spark more luminous.

13. In a speedometer, the combination of a rotatable shaft adapted to be connected with the member the speed of which is to be determined, a pointer of electrically conductive material mounted on said shaft, a scale of conductive material associated with said pointer to form a spark gap, a cam mounted on said shaft, an oscillatory arm, having a normal and an alternate position, and movable in one direction to its alternate position by said cam on the rotation of said shaft, means for returning said arm to its normal position in a constant unit of time when released from said cam, a retaining spring for preventing said arm from rebounding on return to its normal position, an electrical circuit including said pointer and said scale, means operable with said arm for opening said circuit at a predetermined point in the movement of said arm from its alternate to its normal position, the opening of said circuit causing a spark between said pointer and said scale thereby indicating the speed of the member whose speed is to be determined.

14. In a device of the class described, the combination of a rotatable member adapted to be connected with the member the speed of which is to be determined, means for generating light from said rotatable member at the end of a fixed period of time after it passes a predetermined point, and a scale associated with said rotatable member for measuring the distance of said light from said point to indicate the speed of the member whose speed is to be determined.

15. In a device of the class described, the combination of a rotatable member adapted to be connected with the member the speed of which is to be determined, means for generating an electric spark from said rotatable member at the end of a fixed period of time after it passes a predetermined point, and a scale associated with said rotatable member for measuring the distance of said spark from said point to indicate the speed of the member whose speed is to be measured.

16. In a speedometer, the combination of a rotatable shaft adapted to be connected with the member the speed of which is to be determined, a pointer of electrically conductive material mounted on said shaft, a scale of conductive material associated with said pointer to form a spark gap, a cam mounted on said shaft, an oscillatory arm, having a normal and an alternate position, and movable in one direction to its alternate position by said cam on rotation of said shaft, means for returning said arm to its normal position in a constant unit of time when released from said cam, an electric circuit including said pointer and scale, a pair of terminals in said circuit, means in said electrical circuit for normally conductively connecting said terminals, a lug on said arm adapted to electrically disconnect one of said terminals from said means and thereby open said circuit at a predetermined point in the movement of said arm from its alternate to its normal position, said lug holding said terminals disconnected from the means in the circuit while said arm is in its normal position, and means for holding said terminals disconnected while said arm is being moved from its normal to its alternate position.

17. In a device of the class described, the combination of devices for determining a constant time unit, a movable member adapted to be connected with the member the speed of which is to be determined, means carried by the movable member and controlled by said devices for indicating the position of said member after a pre-determined time interval and a scale for said movable member for measuring the distance of the speed indication from a pre-determined point to determine the speed of the member whose speed is to be measured.

18. In a speedometer, the combination of devices for determining a fixed period of time, and means comprising a rotating pointer a scale for measuring the distance of the speed indication from a pre-determined point to determine the speed of the member whose speed is to be measured and means carried by the pointer and controlled by said devices for indicating the position of said pointer after a pre-determined time interval.

19. In combination, a movable member, devices for moving said member a constant distance in a constant of time, a second member adapted to be connected with the member whose speed is to be measured to move a variable distance in a constant time, means carried by the second member and controlled by said devices for indicating the position of said member after a pre-determined time interval and a scale for said movable member for measuring the distance of the speed indication from a pre-determined point to determine the speed of the second member.

20. In a speedometer, the combination of an electrically conductive rotatable member adapted to rotate at a speed proportional to the speed of the shaft to be measured, a second member of electrically conductive material associated with said first member to form a spark gap, means for determining a constant lapse of time, means for adjusting said time determining means and restraining it from action until said first member is in a predetermined position, an electric circuit, a transformer included in said circuit, means connecting the secondary of said transformer with said first member and its associated second member, and means associated with said means for determining a constant lapse of time and adapted for opening said circuit at the end of said constant lapse of time thereby causing a spark to be generated between said first member and said second member, and a condenser in the circuit associated with the primary of said transformer, said condenser adapted to reduce the spark formed in said circuit when the circuit is broken.

21. In a device of the class described, the combination of a rotatable member adapted to be connected with the member the speed of which is to be determined, an electric circuit including said member, means for generating an electric spark from said rotatable member at the end of a fixed period of time after it passes a predetermined point, said spark indicating the position of the rotatable member, means for measuring the distance of said rotatable member from said point, and means for reducing the intensity of other sparks formed in opening the electrical circuit.

22. In a speedometer, the combination of means for determining a constant time unit, a movable member adapted to be connected with the member the speed of which is to be determined, an electric circuit, a transformer included in said circuit, means for connecting the secondary of said transformer with said movable member, means associated with the primary winding of said transformer for breaking the circuit and to produce a spark at the end of said constant time unit, a scale for measuring the distance of said spark from a predetermined point, said spark passing between said movable member and said scale, and a condenser associated with the circuit connected with the primary of said transformer, said condenser being adapted to reduce the spark which is formed when said circuit is broken.

23. In a speedometer, a stationary member, a movable member, and means for causing the generation of a recurrent spot of light between said stationary and movable members and which is adapted to move with the movable member, the displacement between said spot of light and a point on said stationary member indicating the speed of the movable member.

24. In a speedometer, a fixed member, a member movable proportionately to the movement of the member whose speed is to be measured, and means for causing the generation of a recurrent spot of light between said fixed and movable member and which is arranged to move with said movable member, the displacement between said spot of light and a point in said fixed member indicating the speed of the movable member.

25. In a speedometer, a scale, an indicator hand rotatable at a speed proportional to the speed to be measured, and spark generating means for causing a light between said scale and hand thereby prominently disclosing the position of said indicator hand recurrently at regular intervals.

In witness whereof, I hereunto subscribe my name this 25th day of August, A. D. 1909.

ARTHUR F. POOLE.

Witnesses:
HENRY M. HUXLEY,
LEONARD W. NOVANDER.